United States Patent
Kim et al.

(10) Patent No.: US 9,405,411 B2
(45) Date of Patent: Aug. 2, 2016

(54) DISPLAY DEVICE INTEGRATED WITH TOUCH SCREEN AND METHOD OF DRIVING THE SAME

(71) Applicant: LG Display Co., Ltd., Seoul (KR)

(72) Inventors: SungChul Kim, Goyang-si (KR); Junghan Lee, Paju-si (KR); Jeongseop Lee, Gimje-si (KR); SeungEun Pyo, Incheon (KR); Yangsik Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 236 days.

(21) Appl. No.: 13/866,554

(22) Filed: Apr. 19, 2013

(65) Prior Publication Data

US 2014/0111466 A1    Apr. 24, 2014

(30) Foreign Application Priority Data

Oct. 22, 2012 (KR) .................. 10-2012-0117267

(51) Int. Cl.
*G06F 3/045* (2006.01)
*G06F 3/044* (2006.01)
*G06F 3/041* (2006.01)
*G09G 3/36* (2006.01)

(52) U.S. Cl.
CPC .............. *G06F 3/044* (2013.01); *G06F 3/0412* (2013.01); *G09G 3/3651* (2013.01); *G09G 3/3655* (2013.01); *G09G 2300/0426* (2013.01)

(58) Field of Classification Search
CPC ........... G06F 3/044; G06F 3/038; G09G 3/34; G09G 3/36; G09G 5/00; G11C 19/00
USPC ................... 345/173–175; 178/18.01–18.06
See application file for complete search history.

(56) References Cited

U.S. PATENT DOCUMENTS

| | | | |
|---|---|---|---|
| 2009/0135158 A1* | 5/2009 | Takahashi et al. | 345/174 |
| 2010/0182273 A1 | 7/2010 | Noguchi et al. | |
| 2011/0102360 A1 | 5/2011 | Chen et al. | |
| 2011/0267296 A1* | 11/2011 | Noguchi et al. | 345/173 |
| 2012/0038585 A1* | 2/2012 | Kim | 345/174 |
| 2012/0154322 A1* | 6/2012 | Yang et al. | 345/174 |
| 2013/0147724 A1* | 6/2013 | Hwang et al. | 345/173 |
| 2013/0241868 A1* | 9/2013 | Kim et al. | 345/174 |

FOREIGN PATENT DOCUMENTS

| | | |
|---|---|---|
| CN | 101446876 A | 6/2009 |
| CN | 101634917 A | 1/2010 |
| CN | 101681221 A | 3/2010 |
| JP | 2005-227409 A | 8/2005 |

* cited by examiner

*Primary Examiner* — Pegeman Karimi
(74) *Attorney, Agent, or Firm* — Birch, Stewart, Kolasch & Birch, LLP

(57) ABSTRACT

Discussed are a display device integrated with a touch screen and a method of driving the same, which can save the manufacturing cost and prevent the degradation of display quality caused by touch driving.

20 Claims, 15 Drawing Sheets

| | | RX1 | RX2 |
|---|---|---|---|
| Before Touch | TX1 | 1.0844 | 1.08440 |
| | TX2 | 1.0846 | 1.08445 |
| After Touch | TX1 | 0.9087 | 1.0833 |
| | TX2 | 1.0767 | 1.0835 |
| Capacitance Variation | TX1 | 0.1757 | 0.0007 |
| | TX2 | 0.0079 | 0.0010 |

Unit : pF (A)

(B)

(C)

DISPLAY DEVICE INTEGRATED WITH TOUCH SCREEN AND METHOD OF DRIVING THE SAME

CROSS-REFERENCE TO RELATED APPLICATIONS

This application claims the benefit of the Korean Patent Application No. 10-2012-0117267 filed on Oct. 22, 2012 in Republic of Korea, which is hereby incorporated by reference as if fully set forth herein.

BACKGROUND

1. Field of the Invention

The present invention relates to a display device integrated with a touch screen and a method of driving the same.

2. Discussion of the Related Art

Instead of an input device such as a mouse or a keyboard which is conventionally applied to LCD devices, a touch screen (touch sensor) that enables a user to directly input information with a finger or a pen is applied as an input device to LCD devices. The touch screen can be easily manipulated by all users, and thus, the application of the touch screen is being expanded.

Recently, in applying the touch screen to LCD devices, the LCD devices are developed in a type where the touch screen is built in a liquid crystal panel for slimming.

FIGS. 1 and 2 illustrate a touch screen panel of a related art display device integrated with a touch screen, and illustrate a structure of a driving electrode 10 and a structure of a sensing electrode 20.

Referring to FIGS. 1 and 2, the display device integrated with the touch screen uses a common electrode, formed in a lower substrate (thin film transistor (TFT) array substrate), as a means for display, and moreover uses the common electrode as a touch electrode. Here, common electrodes of a plurality of pixels configure one touch block, and a plurality of touch blocks configure a touch screen.

A plurality of the touch blocks are connected to each other in an X-axis direction to configure a plurality of touch driving electrodes 10 (TX). A touch sensing electrode 20 (RX) is provided in a stripe type in a Y-axis direction. A touch driving signal is applied to the touch driving electrodes 10 (TX), and the touch sensing electrode 20 (RX) senses a capacitive change.

Here, the touch driving electrode 10 may be provided in the X-axis direction identically to a direction of a gate line. The touch sensing electrode 10 may be provided in the Y-axis direction identically to a direction of a data line.

In the related art display device integrated with the touch screen, a plurality of the common electrodes are divided into a plurality of the touch driving electrodes 10 and the touch sensing electrodes 20. Therefore, the touch driving electrodes 10 and the touch sensing electrodes 20 are disposed on the same layer.

In order to detect a touched position, it is required to separate the touch driving electrodes 10 and the touch sensing electrodes, and thus, the touch driving electrodes 10 are connected to each other in the X-axis direction by a plurality of contacts 30 and a plurality of bridge lines 40.

Since the bridge lines 40 for connecting the touch driving electrodes 10 in the X-axis direction should be arranged in a display area (i.e., active area) of the liquid crystal panel, the number of masks used in manufacturing and the number of manufacturing processes increase, causing a reduction in productivity.

Due to the increase in numbers of masks and manufacturing processes, the manufacturing cost increases, causing a decrease in price competitiveness. Also, a difference(s) between loads (resistances and capacitances) of the touch driving electrode 10 and touch sensing electrode 20 occurs and causes block dim, and thus, display quality is degraded.

SUMMARY

Accordingly, the present invention is directed to provide a display device integrated with a touch screen and a method of driving the same that substantially obviate one or more problems due to limitations and disadvantages of the related art.

An aspect of the present invention is directed to provide technology that respectively disposes a touch driving electrode and touch sensing electrode of a touch screen on different layers, thus reducing the number of masks used in manufacturing.

Another aspect of the present invention is directed to provide technology for saving the manufacturing cost of a display device integrated with a touch screen.

Another aspect of the present invention is directed to provide a display device integrated with a touch screen and a method of driving the same, which can enhance touch sensing performance without degrading the display quality of an image.

Another aspect of the present invention is directed to provide a display device integrated with a touch screen and a method of driving the same, which can prevent the occurrence of block dim.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with a touch screen which includes: a lower substrate configuring a liquid crystal panel, a plurality of gate lines and a plurality of data lines being arranged to intersect each other in the lower substrate; an upper substrate configuring the liquid crystal panel, the upper substrate being coupled to the lower substrate with a liquid crystal layer therebetween; a pixel electrode disposed in the lower substrate; a common electrode disposed in the lower substrate or the upper substrate; a gate driver supplying a scan signal to the plurality of gate lines; a data driver supplying data voltages to the respective data lines; a touch IC supplying a touch driving signal to the gate line, the data line, or the common electrode; a switching unit switching input or output of signals such that a display signal for image display is supplied to the liquid crystal panel during a display period, and the touch driving signal is supplied to the liquid crystal panel during a non-display period; and a timing controller controlling driving of each of the gate driver, data driver, and touch IC.

In another aspect of the present invention, there is provided a method of driving a display device integrated with a touch screen built in a liquid crystal panel, which includes a driving circuit unit for display driving and touch driving, including:

supplying respective display signals for image display to a gate line, a data line, a pixel electrode, and a common electrode which are disposed in the liquid crystal panel, during a display period; and driving the gate line or the data line as a touch driving electrode to sense a touch, during a non-display period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device integrated with a touch screen and a method of driving the same according to embodiments of the present invention will be described in detail with reference to the accompanying drawings.

In description of embodiments of the present invention, when a structure is described as being formed at an upper portion/lower portion of another structure or on/under the other structure, this description should be construed as including a case where the structures contact each other and moreover a case where a third structure is disposed therebetween.

LCD devices have been variously developed in a twisted nematci (TN) mode, a vertical alignment (VA) mode, an in-plane switching (IPS) mode, and a fringe field switching (FFS) mode according to a scheme of adjusting the alignment of liquid crystal.

Among the modes, the TN mode and the VA mode are modes in which a plurality of pixel electrodes are arranged in a lower substrate, and a plurality of common electrodes are arranged on an upper substrate (color filter array substrate), thereby adjusting the alignment of liquid crystal with vertical electric fields.

The IPS mode and the FFS mode are modes in which a plurality of pixel electrodes and common electrodes are arranged on a lower substrate, thereby adjusting the alignment of liquid crystal with electric fields between the pixel electrodes and the common electrodes.

The IPS mode is a mode in which the pixel electrodes and the common electrodes are alternately arranged in parallel, and thus, lateral electric fields are respectively generated between the pixel electrodes and the common electrodes, thereby adjusting the alignment of the liquid crystal. In the IPS mode, the alignment of the liquid crystal is not adjusted at an upper side portion of each of the pixel electrodes and common electrodes, and thus, light transmittance is reduced in a corresponding area.

The FFS mode has been developed for overcoming the limitations of the IPS mode. In the IPS mode, the pixel electrode and the common electrode is provided in plurality to be separated from each other with an insulating layer therebetween.

In this case, the FFS mode is a mode in which one electrodes of the pixel electrodes and common electrodes are provided in a plate shape or a pattern, and the other electrodes are provided in a finger shape, thereby adjusting the alignment of liquid crystal with fringe fields generated between the pixel electrodes and common electrodes.

An LCD device according to an embodiment of the present invention may use the TN mode, VA mode, IPS mode, and FFS mode, with no limitation in mode.

Figure 1:
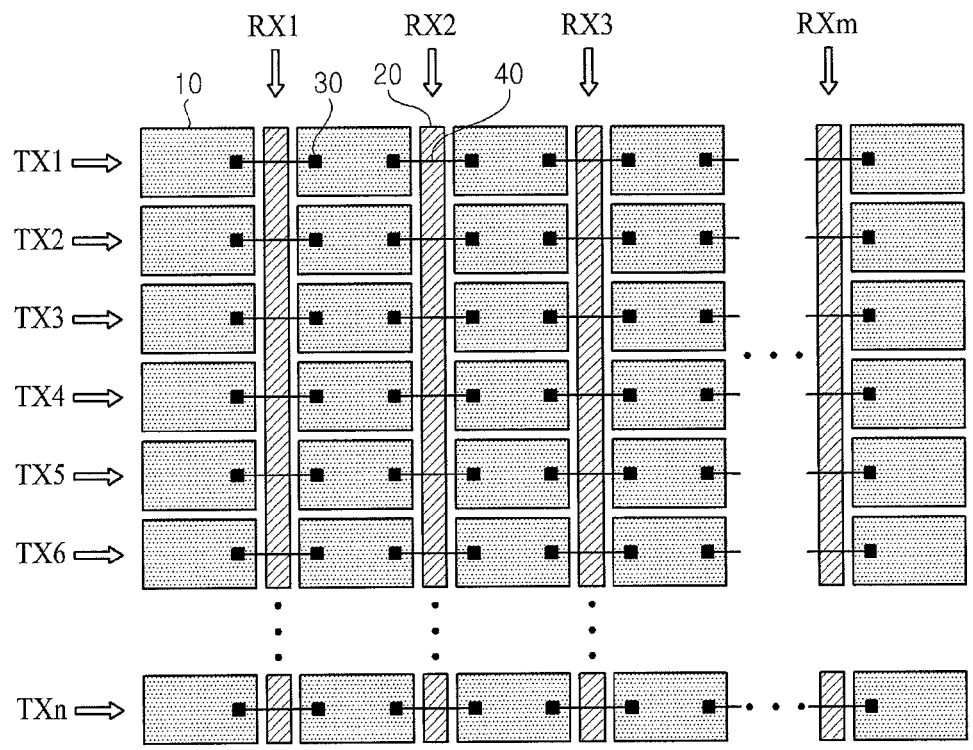
FIG. 1 is a plan view illustrating a structure of a touch screen panel in a related art display device integrated with a touch screen.
Figure 2:
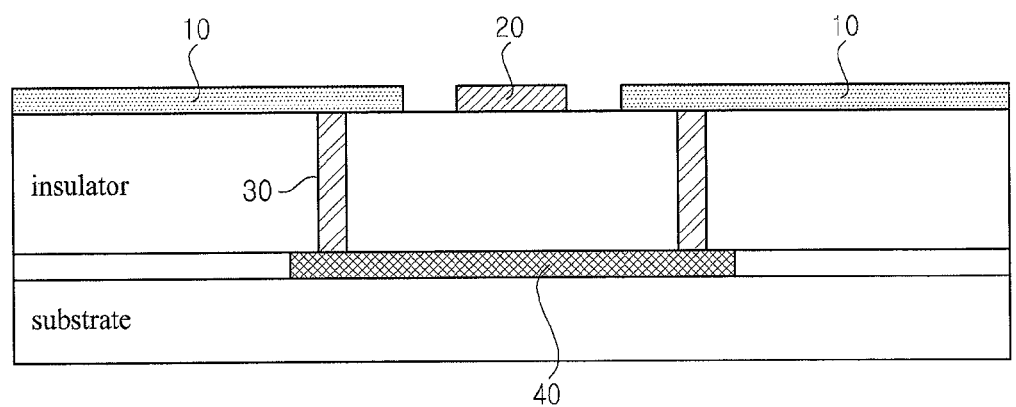
FIG. 2 is a sectional view illustrating the structure of the touch screen panel in the related art display device integrated with a touch screen.
Figure 3:
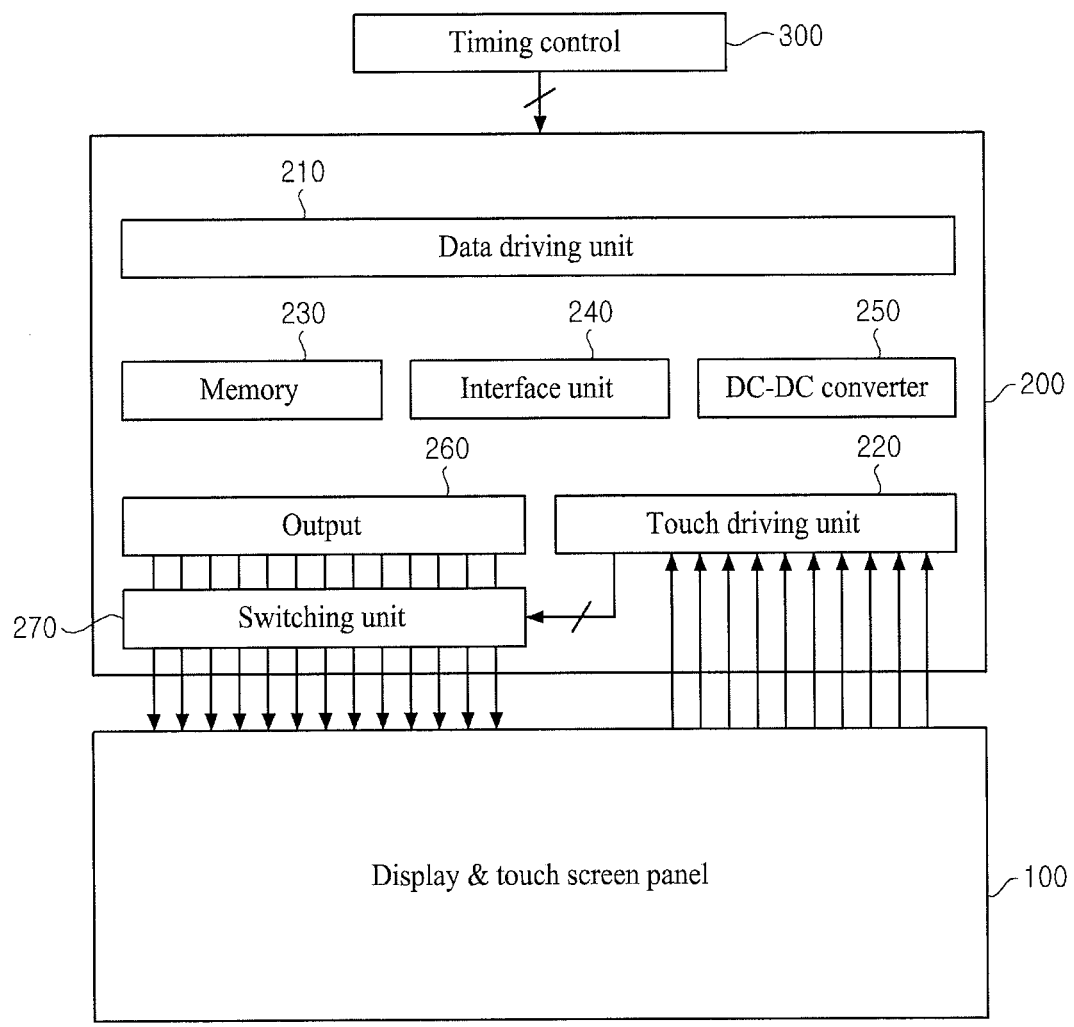
FIG. 3 is a diagram illustrating a display device integrated with a touch screen according to an embodiment of the present invention.
Figure 4:
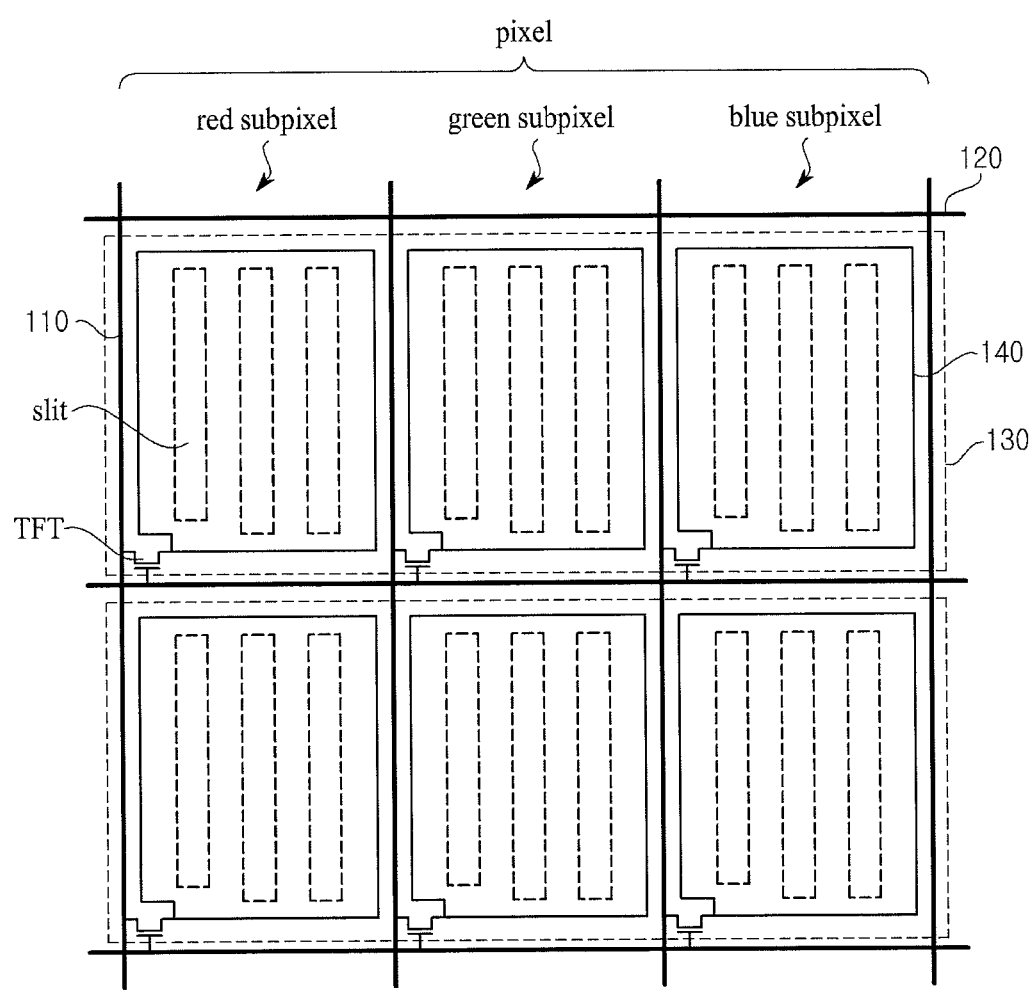
FIG. 4 is a diagram illustrating a structure of a plurality of pixels formed in a liquid crystal panel of FIG. 3.
Figure 5:
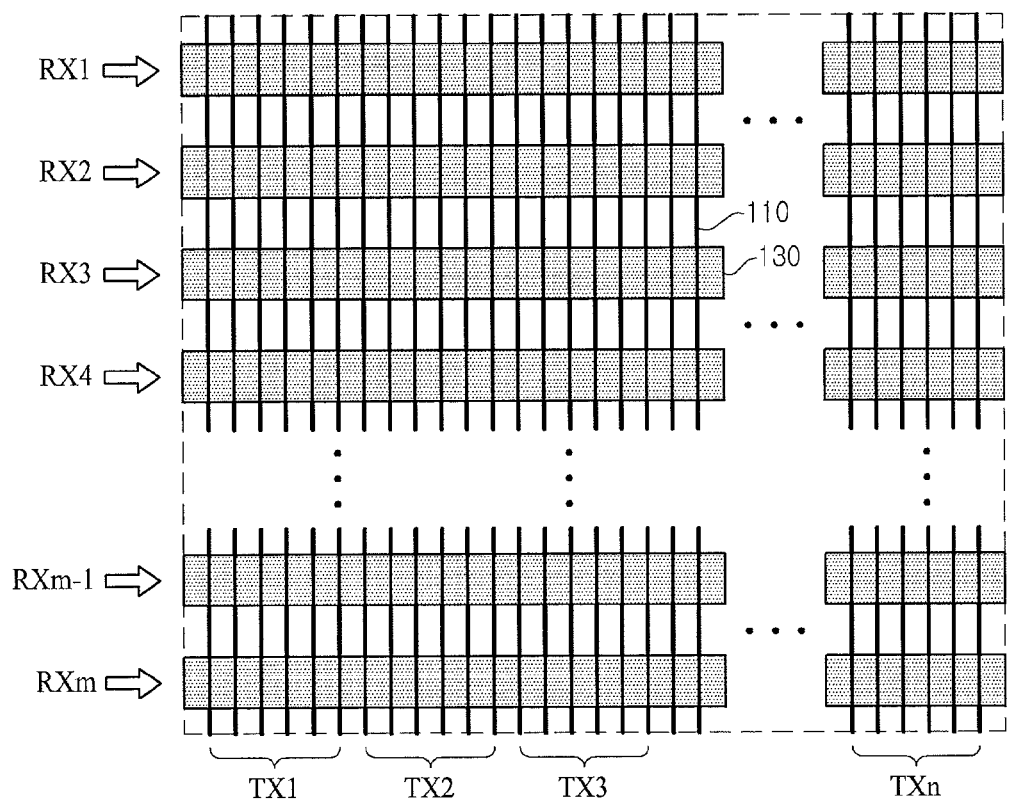
FIG. 5 is a diagram illustrating a structure of a touch screen in the liquid crystal panel of FIG. 3.

FIG. 3 is a diagram illustrating a display device integrated with a touch screen according to an embodiment of the present invention. FIG. 4 is a diagram illustrating a structure of a plurality of pixels formed in a liquid crystal panel of FIG. 3. FIG. 5 is a diagram illustrating a structure of a touch screen in the liquid crystal panel of FIG. 3.

FIG. 4 illustrates a plan view of some of all pixels, and FIG. 5 illustrates a structure of a touch screen built in the liquid crystal panel of FIG. 3.

Referring to FIGS. 3 to 5, the display device integrated with the touch screen according to an embodiment of the present invention includes a liquid crystal panel 100 with a built-in touch screen, a backlight unit, and a driving circuit unit.

In FIGS. 3 to 5, the backlight unit is not illustrated. In FIG. 3, a data driver 200 into which a data driving unit 210 and a touch driving unit 220 are merged is illustrated as an example.

The liquid crystal panel 100 includes a display area and a non-display area, and a plurality of pixels for displaying an image are arranged in a matrix type in the display area.

The liquid crystal panel 100 includes an upper substrate (color filter array substrate), a lower substrate (TFT array substrate), and a liquid crystal layer (not shown) disposed between the two substrates.

Red (R), green (G), and blue (B) color filters (not shown) for displaying a full color image are arranged in the upper substrate, and a black matrix (not shown) for dividing pixels is disposed between adjacent color filters.

The plurality of pixels are arranged in the matrix type in the lower substrate, and, as illustrated in FIG. 4, the plurality of pixels are defined by intersections between a plurality of data lines 110 and a plurality of gate lines 120. The data lines 110 are arranged in a Y-axis direction, and the gate lines 120 are arranged in an X-axis direction.

Although not shown, each of the data lines 110 and the gate lines 120 may be formed in a single layer of Ag, Al, Cu, Mo, or Cr having low resistivity, or formed in a single layer of an alloy.

Alternatively, each of the data line 110 and the gate line 120 may be formed in a single film or multi-layer film formed of an alloy of two or more of Ag, Al, Cu, Mo, or Cr having low resistivity.

Here, one pixel is configured with three subpixels, namely, a red subpixel, a green subpixel, and a blue subpixel. A TFT and a storage capacitor are disposed in each of a plurality of areas in which the data lines 110 and the gate lines 120 intersect each other.

A pixel electrode 140 is disposed in each of the subpixels, and a common electrode 130 is disposed in all the pixels or in units of a certain number of pixels. When the liquid crystal panel 100 is driven in the IPS mode or the FFS mode, the pixel electrode 140 and the common electrode 130 may be disposed in the lower substrate.

When the liquid crystal panel 100 is driven in the TN mode or the VA mode, the pixel electrode 140 may be disposed in the lower substrate, and the common electrode 130 may be disposed in the upper substrate.

The liquid crystal panel 100 cannot self-emit light, and displays an image by using light supplied from the backlight unit (not shown). The backlight unit includes a plurality of backlights (for example, LED or CCFL) emitting light, and an optical member (a light guide plate or a diffusive plate and a plurality of optical sheets) for guiding light, emitted from the backlights, to the liquid crystal panel 100 and enhancing light efficiency.

The driving circuit unit includes a gate driver (not shown), a data driver 200, and a timing controller 300 (T-con). All elements or some elements of the driving circuit unit may be disposed in a chip-on glass (COG) type or a chip-on film (chip-on flexible printed circuit, COF) type, in the liquid crystal panel 100.

The timing controller 300 is a main controller of the display device, and controls the driving of each of the gate driver and the data driver 200.

The timing controller 300 generates a control signal for controlling the gate driver and the data driver 200 with a vertical sync signal Vsync, a horizontal sync signal Hsync, and a clock signal CLK, and supplies the control signal.

The timing controller 300 converts external video signals into frame-unit digital image data R, G and B by using the input vertical sync signal Vsync, horizontal sync signal Hsync, and clock signal CLK. The timing controller 300 supplies the digital image data to the data driving unit 210 of the data driver 200.

Among the elements of the driving circuit unit, the gate driver may be disposed in a gate-in panel (GIP) type in the lower substrate of the liquid crystal panel 100. As another example, the gate driver may be mounted as a separate driver IC on a printed circuit board (PCB).

The gate driver generates a gate driving signal (or scan signal) for driving the TFTs disposed in the respective pixels on the basis of a control signal and a driving signal supplied from the timing controller 300.

The gate driver sequentially supplies the gate driving signal to the plurality of gate lines 120 arranged in the liquid crystal panel 100 during one frame period, and the TFT disposed in each of the pixel is driven by the gate driving signal, thereby turning on each pixel.

The data driver 200 includes a data driving unit 210 for respectively supplying data voltages to the pixels arranged in the liquid crystal panel 100, and a touch driving unit 220 for detecting a touch. Here, the data driving unit 210 may use a data driver IC, and the touch driving unit 220 may use a touch IC.

Moreover, the data driver 200 includes a memory 230 for storing input image data, an interface unit 240 for controlling communication, a DC-DC converter 250 for increasing data voltages, an output unit 260 for outputting the image data and a touch driving signal to the respective pixels of the liquid crystal panel 100, and a switching unit 270 for switching an output of each of the image data and the touch driving signal.

The data driving unit 210 converts digital image data R, G and B, supplied from the timing controller 300, into data voltages. The data driving unit 210 supplies the data voltages to the respective data lines 110 arranged in the liquid crystal panel 100 at a time where the TFT of each pixel is turned on, according to a data control single DCS from timing controller 300.

The touch driving unit 220 supplies the touch driving signal for touch detection to a plurality of touch driving electrodes (TX) arranged in the liquid crystal panel 100. Also, the touch driving unit 20 senses a capacitive change through a plurality of touch sensing electrodes (RX) to detect a touched position.

In the display device integrated with the touch screen according to an embodiment of the present invention, the existing elements disposed in the liquid crystal panel 100 may configure at least one electrodes of the touch driving electrodes (TX) and the touch sensing electrodes (RX).

For example, the data lines 110, gate lines 120, or common electrodes 130 disposed in the liquid crystal panel 100 may be used as the touch driving electrodes (TX). Alternatively, the data lines 110, gate lines 120, or common electrodes 130 disposed in the liquid crystal panel 100 may be used as the touch sensing electrodes (RX).

In a detailed embodiment, referring to FIG. 5, the data lines 110 arranged in the lower substrate of the liquid crystal panel 100 may be used to supply data voltages to the respective subpixels, and moreover used as the touch driving electrodes (TX) that receives the touch driving signal for touch sensing.

Here, all of the data lines 110 may be grouped in units of a certain number of data lines to configure a plurality of touch driving electrodes (TX). For example, a group of ten data lines may configure one touch driving electrode, in which case a plurality of touch driving electrodes equal to one-tenth of the total number of data lines may be configured.

As described above, according to the present invention, the data lines 110 arranged in the lower substrate of the liquid crystal panel 100 may be used as the touch driving electrodes (TX), and moreover, the elements other than the data lines 110 may be used as the touch sensing electrodes (RX) for touch sensing. As an example, the common electrodes 130 disposed in the lower substrate or the upper substrate may be used as electrodes for image display, and moreover used as the touch sensing electrodes (RX) for touch sensing.

Figure 6:
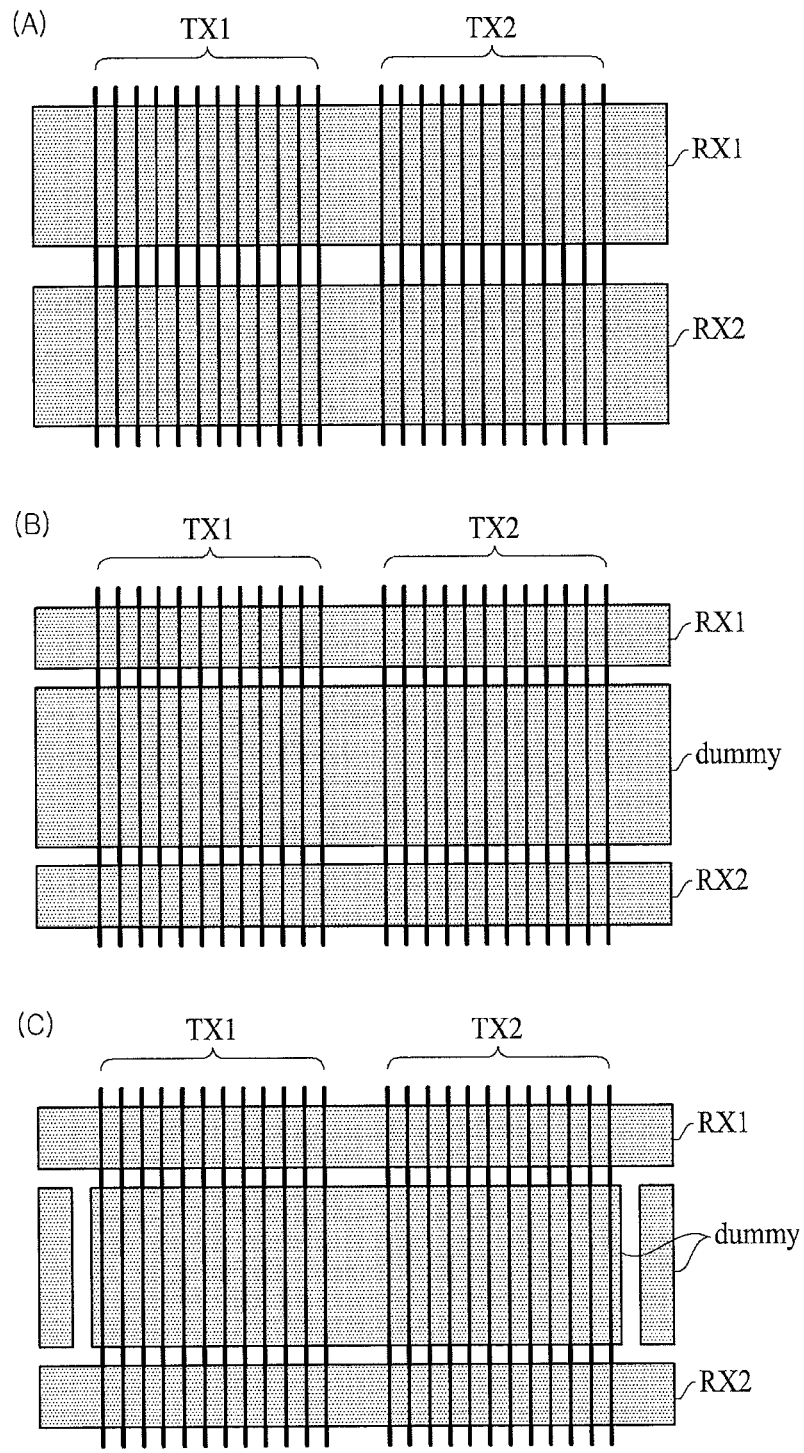
FIGS. 6(A)-6(C) are diagrams illustrating respective structures of a touch driving electrode and a touch sensing electrode.

FIGS. 6(A)-6(C) are diagrams illustrating respective structures of a touch driving electrode and a touch sensing electrode.

Referring to FIGS. 6(A)-6(C), the common electrodes 130 may be provided in a direction perpendicular to the data lines 110, namely, in a direction perpendicular to the touch driving electrodes TX. In this case, the common electrodes (touch sensing electrodes) 130 may be provided in a stripe type, namely, may be provided as a plurality of bars to perpendicularly intersect the touch driving electrodes (TX) and the touch sensing electrodes (RX).

Like this, the data lines 110 may be arranged in the lower substrate, and, when the common electrodes 130 are arranged in the upper substrate, the touch driving electrodes (TX) and the touch sensing electrodes (RX) may perpendicularly intersect each other on different layers.

On the other hand, when the data lines 110 and the common electrodes 130 are disposed in the lower substrate, the touch driving electrodes (TX) and the touch sensing electrodes (RX) may be disposed on different layers or the same layer.

Here, the touch sensing electrodes (RX) may be arranged at certain intervals so as to reduce interference therebetween. Also, a dummy pattern may be disposed between adjacent touch sensing electrodes (RX).

Figure 7:
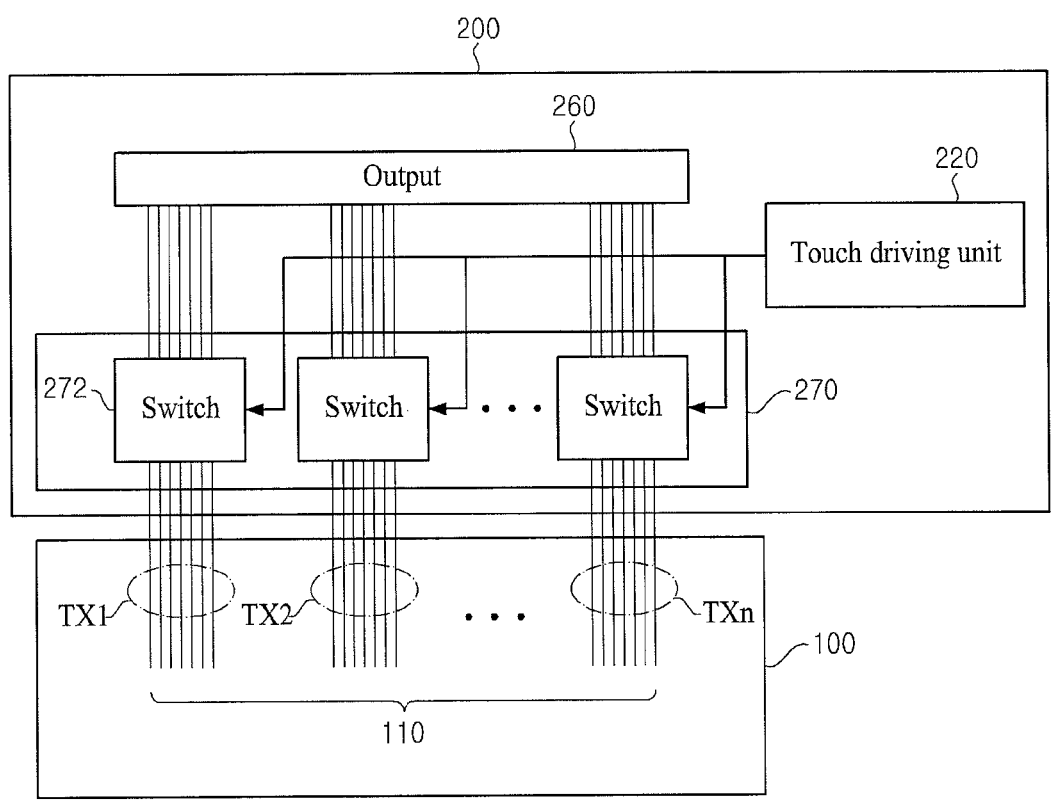
FIG. 7 illustrates a data driver according to an embodiment of the present invention into which a data driver IC and a touch IC are integrated, and is a diagram illustrating an embodiment in which a switching unit is built in the data driver.

FIG. 7 illustrates a data driver according to an embodiment of the present invention into which a data driver IC and a touch IC are integrated, and is a diagram illustrating an embodiment in which a switching unit is built in the data driver.

Referring to FIG. 7, as described above, the plurality of data lines 110 is grouped in units of a certain number of data lines to configure a plurality of touch driving electrodes (TX). Here, data voltages should be supplied to the respective data lines 110 in display driving, and the touch driving signal should be supplied to the touch driving electrodes (TX) in non-display driving.

Specifically, a switch 272 is disposed in units of one touch driving electrode (TX) to switch an output of the data line 110. That is, a plurality of switches 272 equal to the number of touch driving electrodes (TX) are included in the switching unit 270. Here, the plurality of switches 272 configuring the switching unit 270 may be provided inside the data driver 200.

The data lines 110 may be used as two functions in a time division scheme by using the plurality of switches 272 configuring the switching unit 270.

1) In display driving, the data lines 110 are used for display by supplying data voltages to the respective data lines 110.

2) In non-display driving, the data lines 110 are used for touch sensing by supplying the touch driving signal to the touch driving electrodes (TX), namely, the data lines 110.

Here, the plurality of switches 272 configuring the switching unit 270 may be controlled by the touch driving unit 220. Alternatively, the timing controller 300 may control the plurality of switches 272 configuring the switching unit 270.

As in an embodiment of the present invention, when the data driver 200 with the data driver IC and touch IC integrated thereinto is applied, the data driver IC and the touch IC may use the memory 230 and the DC-DC converter 250 in common, thus saving the manufacturing cost.

Figure 8:
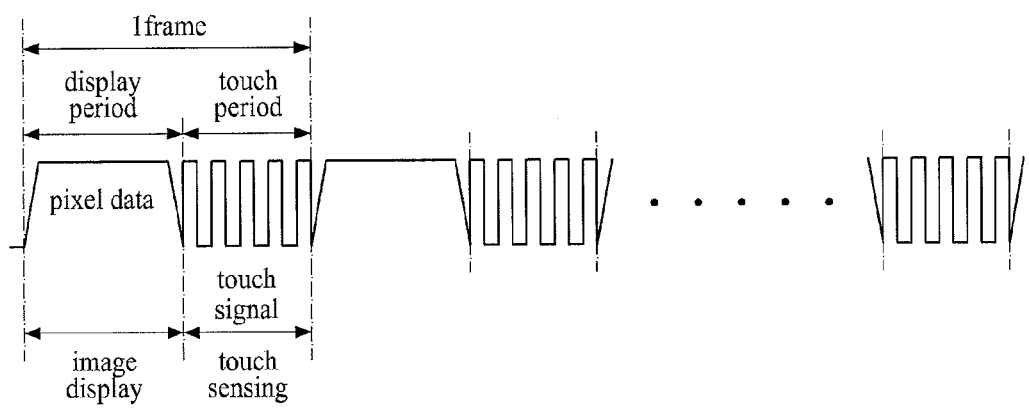
FIGS. 8(A) and 8(B) are diagrams for describing a method of driving the display device integrated with the touch screen according to an embodiment of the present invention.
Figure 8:
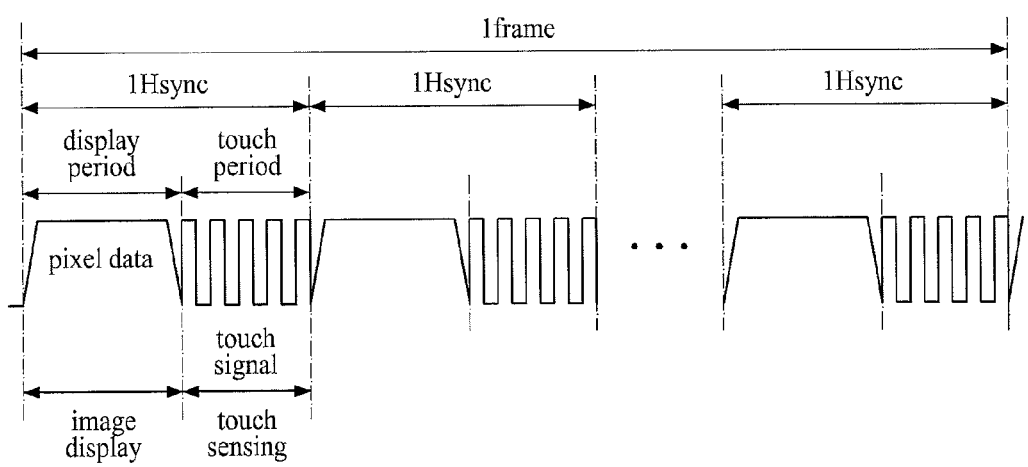
Figure 9:
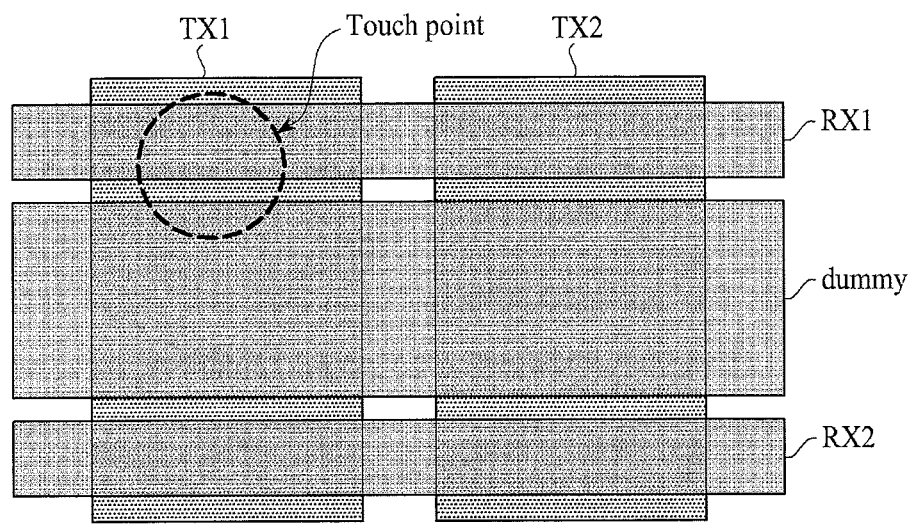
FIG. 9 shows diagrams for describing the method of driving the display device integrated with the touch screen according to an embodiment of the present invention.

FIGS. 8(A)-9 are diagrams for describing a method of driving the display device integrated with the touch screen according to an embodiment of the present invention.

Referring to FIG. 8(A), in the display device integrated with the touch screen according to an embodiment of the present invention, a plurality of switching blocks 272 configuring the switching unit 270 are switched on in order for data voltages from the output unit 260 to be supplied to the respective data lines 110 during a display period in one frame.

Moreover, a common voltage (Vcom) is supplied to the common electrodes 130. Therefore, an image corresponding to an image signal is displayed by adjusting transmittance of light passing through the liquid crystal layer according to data voltages and the common voltage applied to the respective pixels.

In a non-display period, the switching blocks 272 configuring the switching unit 270 are switched on in order for the touch driving signal from the touch driving unit 220 to be supplied to the touch driving electrodes (TX).

Here, the switching unit 270 is built in the data driver 200, and a certain number of data lines 110 are grouped to configure one touch driving electrode (TX). At this point, the common voltage or a ground voltage (GND) is supplied to the common electrodes 130. Thus, by using the data lines 110 as the touch driving electrodes (TX), the touch driving signal is uniformly supplied to an entire screen.

As shown in FIG. 8(B), the touch driving signal may be supplied to the touch driving electrodes (TX) in units of one horizontal period or in units of a plurality of horizontal periods. That is, one horizontal period is divided into a display period and a touch sensing period, and data voltages are supplied to the respective data lines 110 during the display period. Furthermore, the touch driving signal may be supplied to the data lines 110 driven as the touch driving electrodes (TX) during the touch sensing period.

As shown in FIGS. 8(A)-9, when the touch driving signal is supplied to the data lines 110 driven as the touch driving electrodes (TX), a capacitance generated in each of the touch sensing electrodes (RX) is changed by a user's touch.

The touch driving unit 220 compares a touch sensing signal (i.e., a capacitance generated in a corresponding touch electrode), applied from a corresponding touch sensing electrode (RX) built in or disposed outside the liquid crystal panel 100, with a reference value to determine whether there is a user's touch. Also, the touch driving unit 220 detects a touch driving line (TX) and a touch sensing line (RX), in which the capacitive change is greater than the reference value, to sense a position (touch point) touched by the user.

As another example, the touch driving unit 220 may detect whether there is a user's touch and a touched position (touch point) during a reference signal (blank signal) period that divides a previous frame and a next frame. The start and end of an operation of detecting a position touched by the user may be performed based on the vertical sync signal Vsync. An operation of detecting whether there is a touch and a touched position may be performed during a vertical blank (V-blank) period that divides a previous frame and a next frame.

In the embodiment, it has been described above that the common electrodes disposed in the lower substrate or the upper substrate are used as the touch sensing electrodes (RX). However, this description has been made on one of various embodiments of the present invention.

Figure 10:
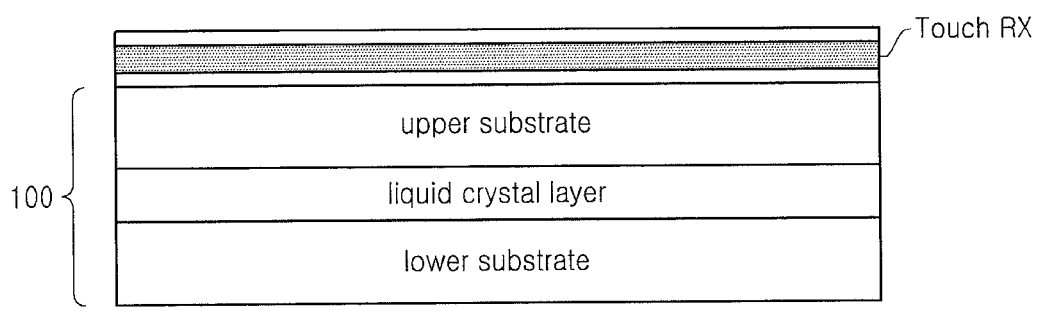
FIGS. 10(A)-10(C) are views illustrating various embodiments enabling the application of a touch sensing electrode.
Figure 10:
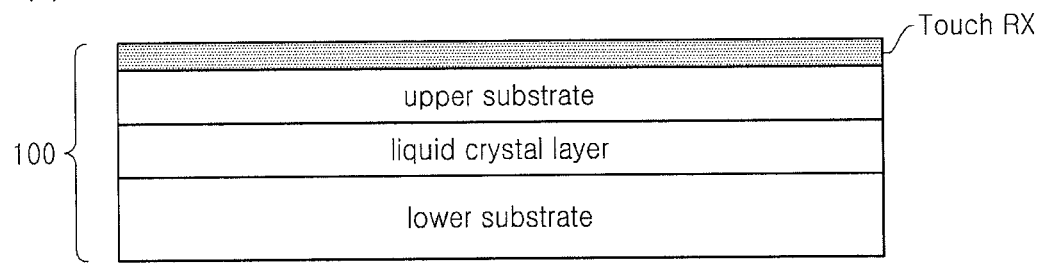
Figure 10:
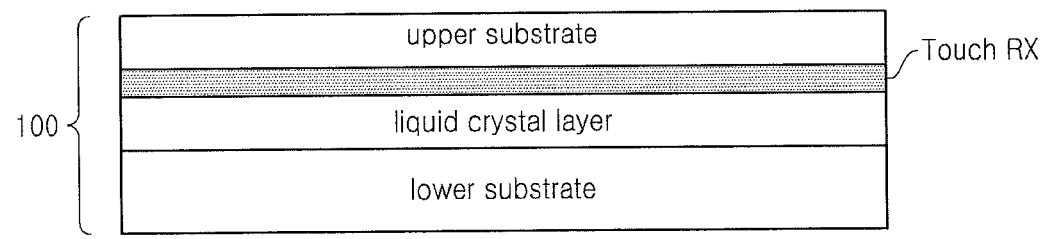

FIGS. 10(A)-10(C) are views illustrating various embodiments enabling the application of a touch sensing electrode.

Referring to FIG. 10(A), in the display device integrated with the touch screen according to an embodiment of the present invention, the touch sensing electrodes (RX) may be disposed in the add-on type on the liquid crystal panel 100. In this case, the touch sensing electrodes (RX) may be formed in a glass substrate, a plastic substrate, or a film, and then disposed on the liquid crystal panel 100.

Referring to FIG. 10(B), in the display device integrated with the touch screen according to an embodiment of the present invention, the touch sensing electrodes (RX) may be formed at a top of the upper substrate. That is, the touch sensing electrodes (RX) may be formed on a color filter (CF).

Referring to FIG. 10(C), in the display device integrated with the touch screen according to an embodiment of the present invention, the touch sensing electrodes (RX) may be formed at a bottom of the upper substrate. That is, the touch sensing electrodes (RX) may be formed under the color filter (CF).

In embodiments of FIGS. 10(A)-10(C), the touch sensing electrodes (RX) are disposed on a plane displayed on a screen, and thus, the touch sensing electrodes RX may be formed of a transparent conductive material such as indium tin oxide (ITO) or indium zinc oxide (IZO). In this case, the data driver 200 including the touch driving unit 220 may be connected to the touch sensing electrodes (RX) by a flexible printed circuit (FPC).

As another example, the data driver 200 including the touch driving unit 220 may be connected to a pad disposed in the lower substrate of the liquid crystal panel 100, and the touch sensing electrodes (RX) may be connected to the pad of the lower substrate, thereby connecting the touch driving unit 220 to the touch sensing electrodes (RX).

Figure 11:
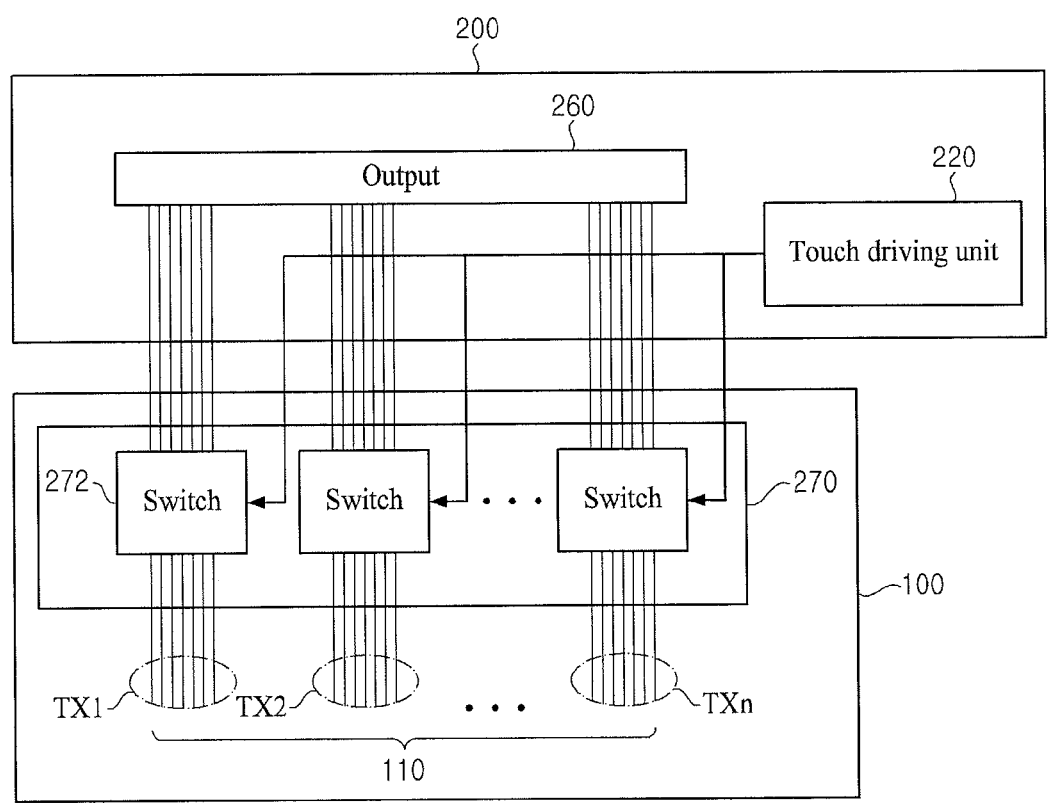
FIG. 11 is a diagram illustrating a data driver with a data driver IC and a touch IC integrated thereinto and a liquid crystal panel with a built-in switching unit, according to another embodiment of the present invention.

FIG. 11 is a diagram illustrating a data driver with a data driver IC and a touch IC integrated thereinto and a liquid crystal panel with a built-in switching unit, according to another embodiment of the present invention.

Referring to FIG. 11, a plurality of data lines 110 are grouped in units of a certain number of data lines to configure a plurality of touch driving electrodes (TX), and a switch 272 is disposed in units of one touch driving electrode (TX), thereby switching output of corresponding data lines 110.

Here, a switching unit 270 including a plurality of the switches 272 for switching output of the data lines 110 may be disposed inside the liquid crystal panel 100. Similarly to that a gate driver is disposed in the GIP type in a lower substrate of a liquid crystal panel 100, the switches 272 of the switching unit 270 may be disposed in the lower substrate of the liquid crystal panel 100.

Although the switching unit 270 is disposed inside the liquid crystal panel 100, the data lines 110 may be used as two functions in a time division scheme. 1) In display driving, data voltages are supplied to the respective data lines 110. 2) In non-display driving, a touch driving signal is supplied to the touch driving electrodes (TX), namely, the data lines 110.

Here, the plurality of switches 272 configuring the switching unit 270 may be controlled by the touch driving unit 220. Alternatively, the timing controller 300 may control the plurality of switches 272 configuring the switching unit 270.

Figure 12:
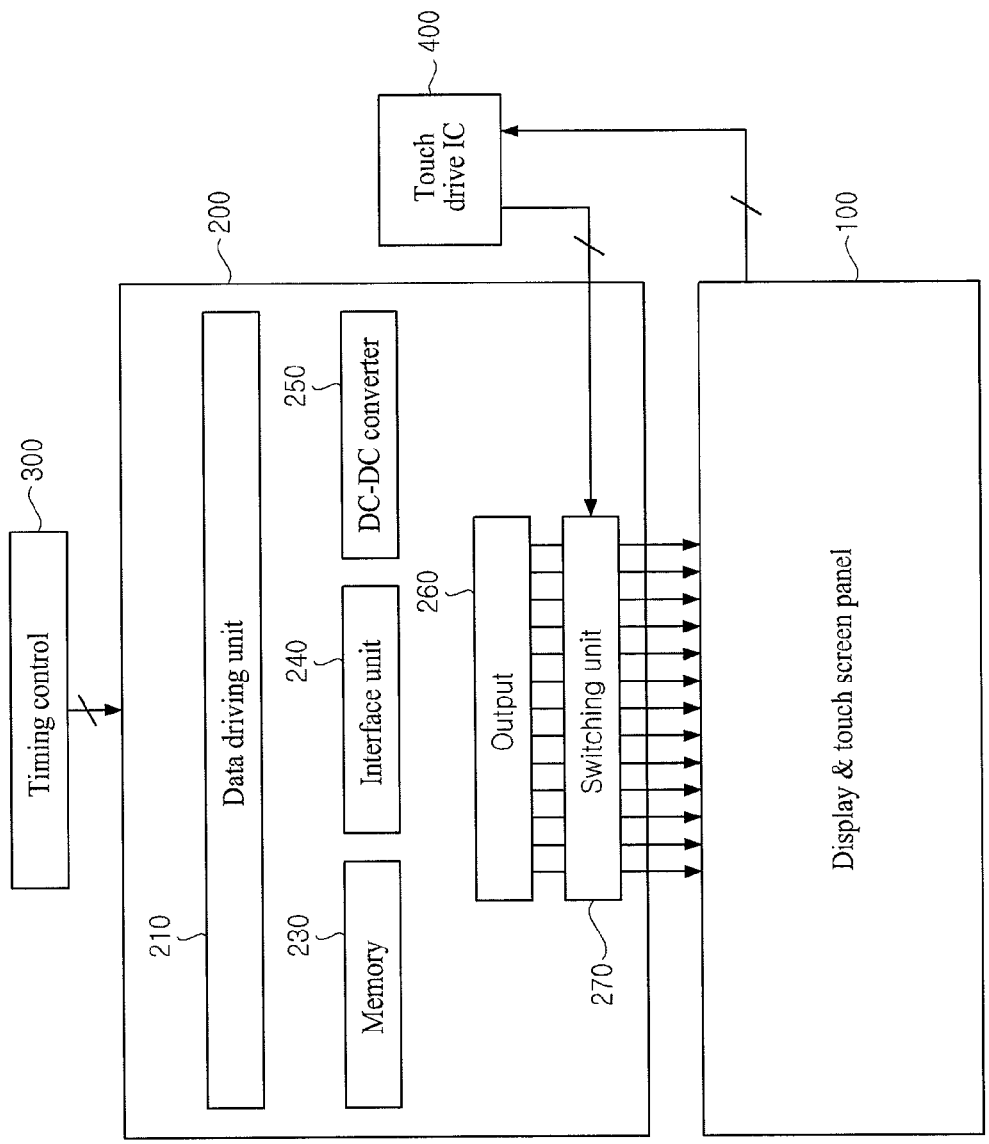
FIG. 12 is a diagram illustrating a display device integrated with a touch screen according to another embodiment of the present invention.
Figure 13:
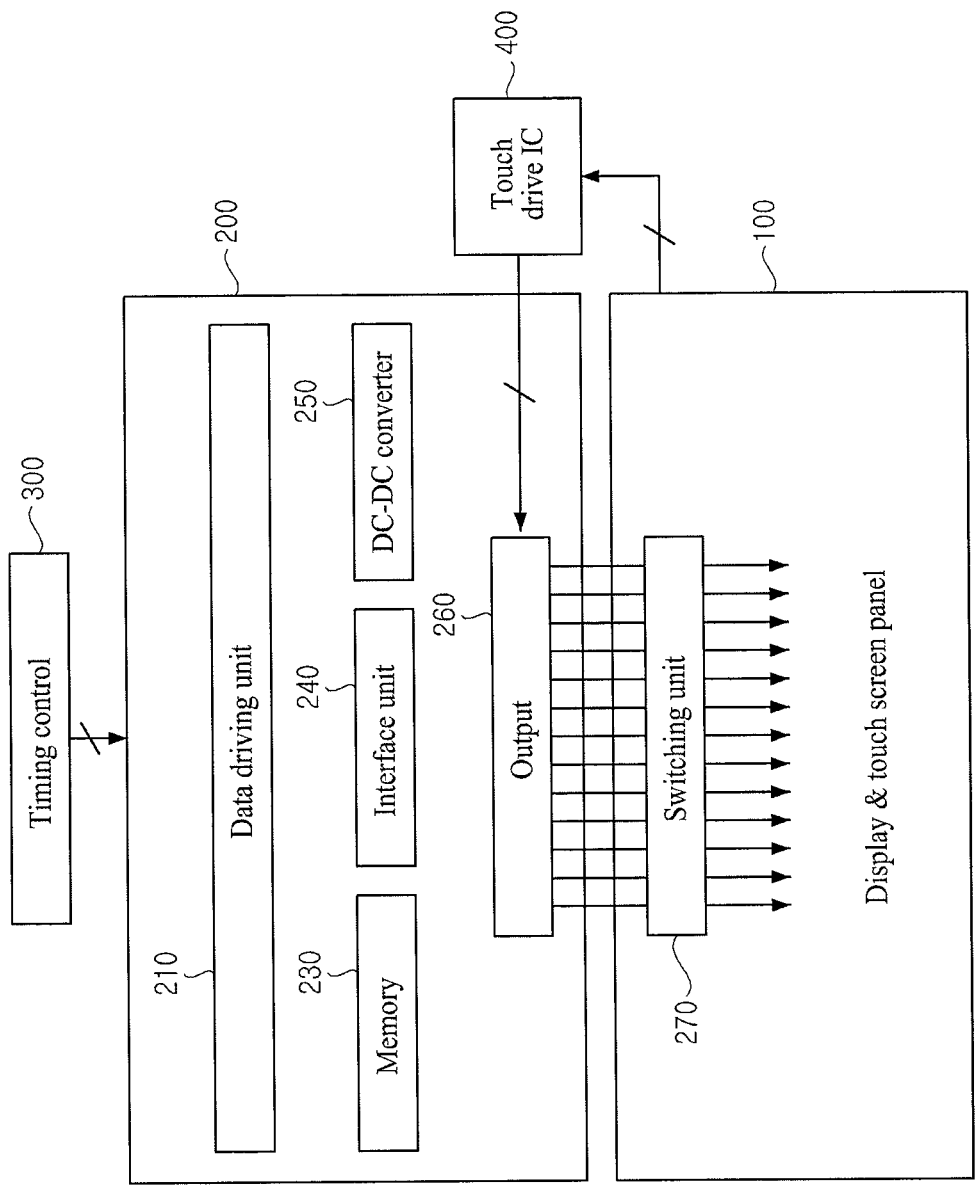
FIG. 13 is a diagram illustrating a display device integrated with a touch screen according to another embodiment of the present invention.

FIGS. 12 and 13 are diagrams illustrating a display device integrated with a touch screen according to another embodiment of the present invention.

Referring to FIG. 12, in the display device integrated with the touch screen according to another embodiment of the present invention, a data driver 200 and a touch IC 400 may be configured separately. In this case, a switching unit 270 for driving a plurality of data lines 110 as touch driving electrodes (TX) may be provided inside the data driver 200 identically to FIGS. 3 and 7.

Here, a plurality of touch sensing electrodes (RX) may be provided identically to the description of FIGS. 5, 6(A)-6(C) and 10(A)-10(C), and display driving and touch sensing driving may also be applied identically to the above-described embodiments.

Referring to FIG. 13, in the display device integrated with the touch screen according to another embodiment of the present invention, a data driver 200 and a touch IC 400 may be configured separately. In this case, a switching unit 270 for driving a plurality of data lines 110 as touch driving electrodes (TX) may be provided inside a liquid crystal panel 100 identically to FIG. 11.

Here, a plurality of touch sensing electrodes (RX) may be provided identically to the description of FIGS. 5, 6(A)-6(C) and 10(A)-10(C), and display driving and touch sensing driving may also be applied identically to the above-described embodiments.

Figure 14:
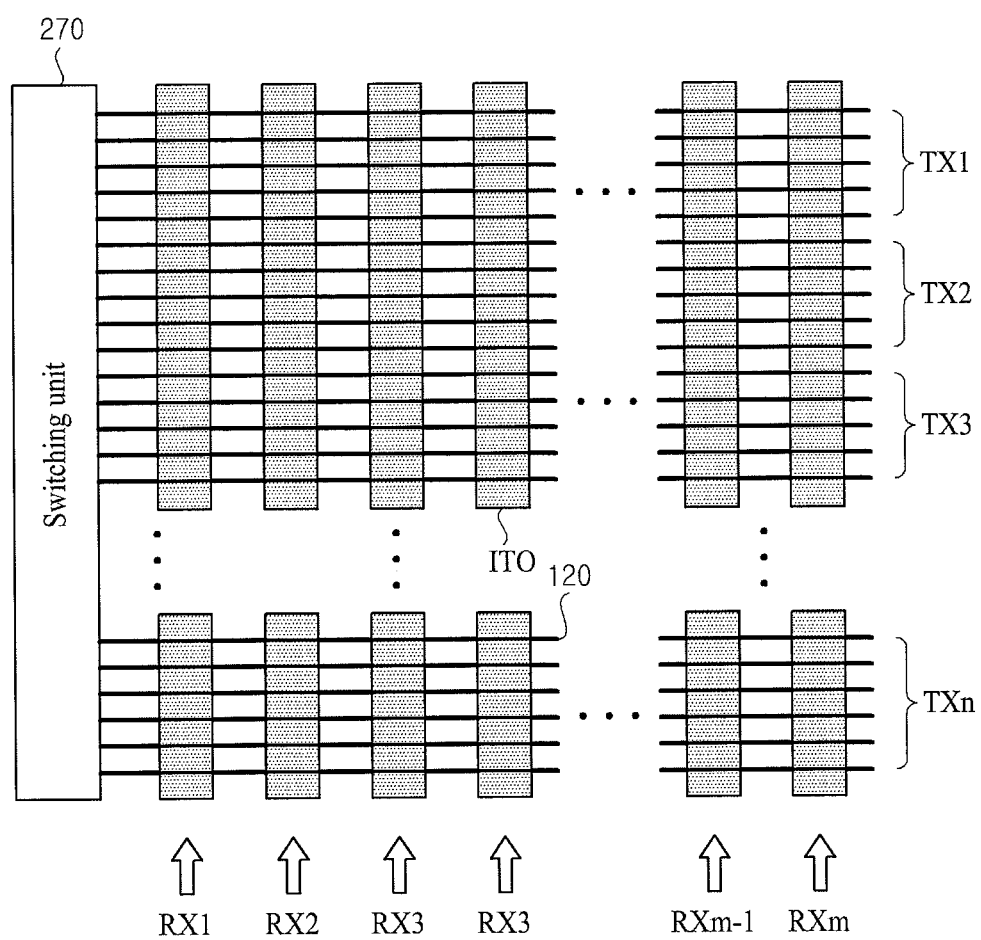
FIG. 14 illustrates a display device integrated with a touch screen according to another embodiment of the present invention, and is a diagram illustrating that a gate line is used as a touch driving electrode and a touch sensing electrode is provided in an on-cell type or an add-on type.

FIG. 14 illustrates a display device integrated with a touch screen according to another embodiment of the present invention, and is a diagram illustrating that a gate line is used as a touch driving electrode and a touch sensing electrode is provided in an on-cell type or an add-on type.

Referring to FIG. 14, in the display device integrated with the touch screen according to another embodiment of the present invention, a plurality of gate lines 120 arranged in the liquid crystal panel 100 may be used as touch driving electrodes (TX), and a plurality of touch sensing electrodes (RX) may be provided in the on-cell type or add-on type of FIGS. 10(A)-10(C).

Although not shown, the gate lines 120 arranged in the liquid crystal panel 100 may be used as the touch driving electrodes (TX), and the common electrodes 130 disposed in the lower substrate or the upper substrate may be used as the touch sensing electrodes (RX).

Here, output of the gate lines 120 used as the touch driving electrodes (TX) are controlled by the switching unit 270. During the display period, a scan signal is supplied to the gate lines 120. During the non-display period, the touch driving signal is supplied to the gate lines 120, namely, the touch driving electrodes (TX).

In this case, the switching unit 270 may be provided inside the data driver 200 identically to FIGS. 3 and 7. As another example, when the gate driver is disposed in the GIP type in the lower substrate of the liquid crystal panel 100, the switching unit 270 may be provided inside the liquid crystal panel 100 in a type similar to the above-described embodiment.

Figure 15:
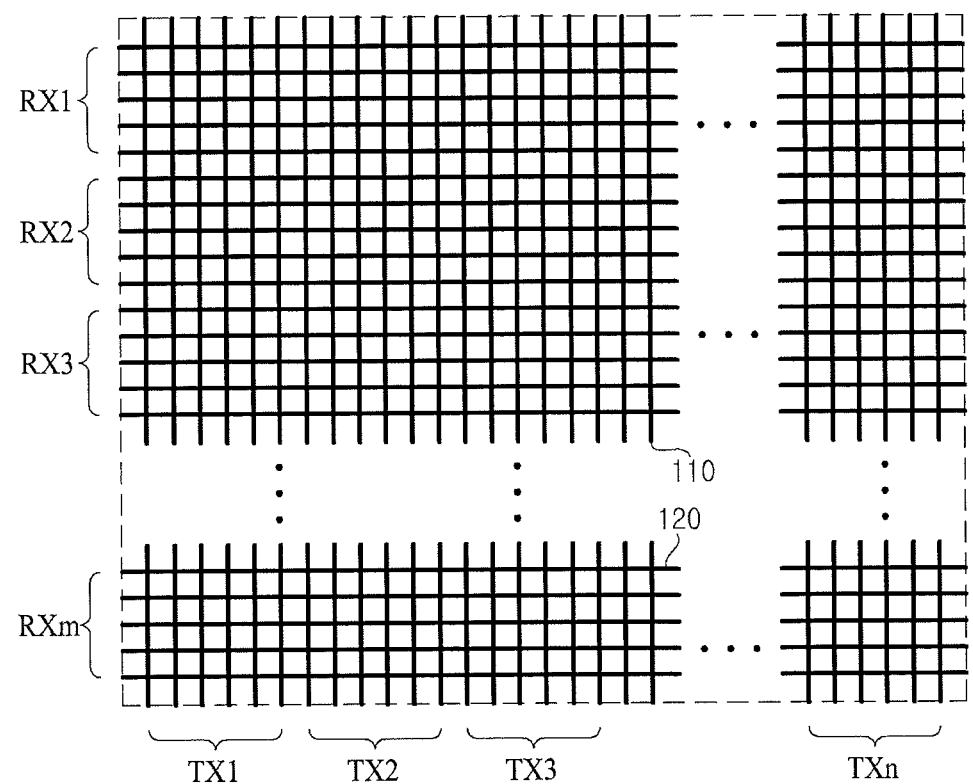
FIG. 15 illustrates a display device integrated with a touch screen according to another embodiment of the present invention, and is a diagram illustrating that a data line is used as a touch driving electrode and a gate line is used as a touch sensing electrode.

FIG. 15 illustrates a display device integrated with a touch screen according to another embodiment of the present invention, and is a diagram illustrating that a data line is used as a touch driving electrode and a gate line is used as a touch sensing electrode.

Referring to FIG. 15, in the display device integrated with the touch screen according to another embodiment of the present invention, a plurality of data lines 110 arranged in the liquid crystal panel 100 may be used as touch driving electrodes (TX), and a plurality of gate lines 120 may be used as touch sensing electrodes (RX).

Here, output of the data lines 110 used as the touch driving electrodes (TX) and input/output of the gate lines 120 used as the touch sensing electrodes (RX) are controlled by the switching unit 270.

During the display period, data voltages may be supplied to the respective data lines 110. During the non-display period, the touch driving signal is supplied to the data lines 110, namely, the touch driving electrodes (TX).

Moreover, during the display period, the scan signal is supplied to the gate lines 120. During the non-display period, the gate lines 120, namely, the touch sensing electrodes (RX) may be connected to the data driver 200 or the touch IC 400.

Figure 16:
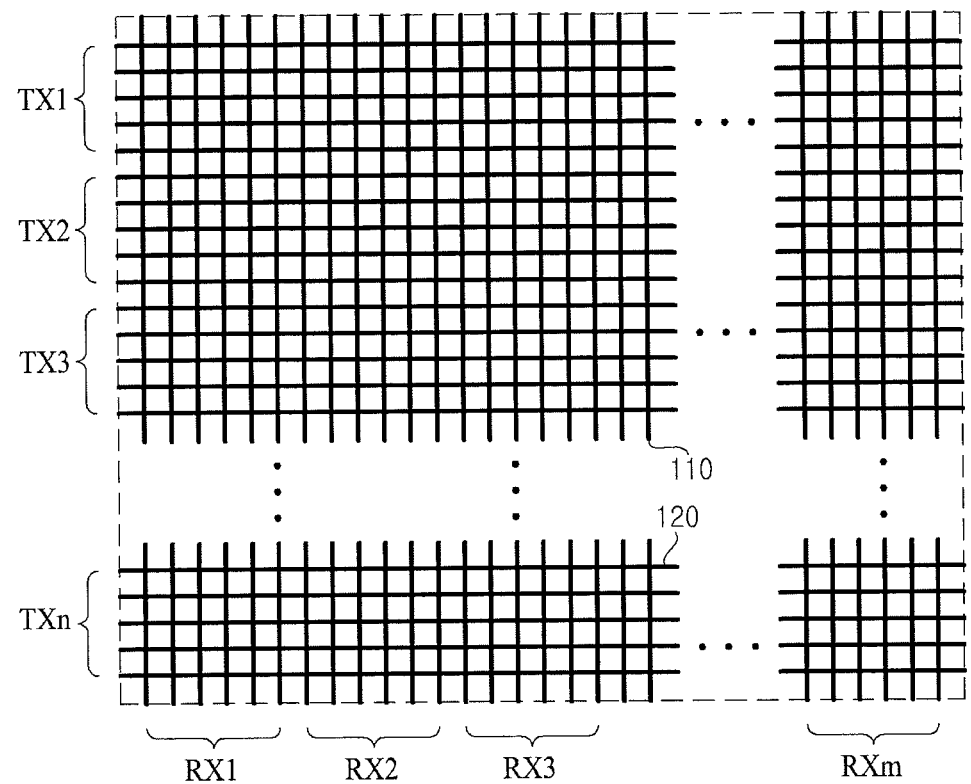
FIG. 16 illustrates a display device integrated with a touch screen according to another embodiment of the present invention, and is a diagram illustrating that a gate line is used as a touch driving electrode and a data line is used as a touch sensing electrode.

FIG. 16 illustrates a display device integrated with a touch screen according to another embodiment of the present invention, and is a diagram illustrating that a gate line is used as a touch driving electrode and a data line is used as a touch sensing electrode.

Referring to FIG. 16, in the display device integrated with the touch screen according to another embodiment of the present invention, a plurality of gate lines 120 arranged in the liquid crystal panel 100 may be used as touch driving electrodes (TX), and a plurality of data lines 110 may be used as touch sensing electrodes (RX).

Here, output of the gate lines 120 used as the touch driving electrodes (TX) and input/output of the data lines 110 used as the touch sensing electrodes (RX) are controlled by the switching unit 270.

During the display period, the scan signal may be supplied to the gate lines 120. During the non-display period, the touch driving signal is supplied to the gate lines 120, namely, the touch driving electrodes (TX).

Moreover, during the display period, data voltages may be supplied to the respective data lines 110. During the non-display period, the data lines 110, namely, the touch sensing electrodes (RX) may be connected to the data driver 200 or the touch IC 400.

In another embodiment described above with reference to each of FIGS. 15 and 16, the switching unit 270 may be provided inside the data driver 200 identically to FIGS. 3 and 7. As another example, when the gate driver is disposed in the GIP type in the lower substrate of the liquid crystal panel 100, the switching unit 270 may be provided inside the liquid crystal panel 100 in a type similar to the above-described embodiments.

In the above-described display device integrated with the touch screen according to the embodiments of the present invention, the touch driving electrodes (TX) and touch sensing electrodes (RX) of the touch screen are disposed on different layers, thus reducing the number of masks used in manufacturing and saving the manufacturing cost.

In the display device integrated with the touch screen and the method of driving the same according to the embodiments of the present invention, by using the data lines 110 or gate lines 120 arranged in the liquid crystal panel 100 as the touch driving electrodes (TX) and using the common electrodes as the touch sensing electrodes (RX), block dim caused by a load difference between the touch driving electrode (TX) and the touch sensing electrode (RX) can be prevented. Accordingly, touch sensing performance can be enhanced without the degradation of display quality.

Moreover, in the display device integrated with the touch screen and the method of driving the same according to the embodiments of the present invention, the data lines 110 or gate lines 120 arranged in the liquid crystal panel 100 are used as the touch driving electrodes (TX), and the touch driving electrodes (TX) are disposed in the upper substrate of the liquid crystal panel 100 or separately disposed on the liquid crystal panel 100, thus preventing block dim caused by a load difference between the touch driving electrode (TX) and the touch sensing electrode (RX).

In the display device integrated with the touch screen according to the embodiments of the present invention, the data driver IC and the touch IC are integrated into one data driver, thus saving the manufacturing cost.

As described above, in the display device integrated with the touch screen and the method of driving the same according to the embodiments of the present invention, the touch driving electrode and touch sensing electrode of the touch screen are respectively disposed on different layers, thus reducing the number of masks used in manufacturing and saving the manufacturing cost.

Moreover, in the display device integrated with the touch screen and the method of driving the same according to the embodiments of the present invention, touch sensing performance can be enhanced without the degradation of display quality.

Moreover, the display device integrated with the touch screen and the method of driving the same according to the embodiments of the present invention can prevent the occurrence of block dim.

Moreover, in the display device integrated with the touch screen and the method of driving the same according to the embodiments of the present invention, touch sensing performance can be enhanced.

Moreover, in the display device integrated with the touch screen according to the embodiments of the present invention, the data driver IC and the touch IC are integrated into one data driver, thus saving the manufacturing cost.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device integrated with a touch screen, comprising:
   a lower substrate configuring a liquid crystal panel, a plurality of gate lines and a plurality of data lines being arranged to intersect each other in the lower substrate;
   an upper substrate configuring the liquid crystal panel, the upper substrate being coupled to the lower substrate with a liquid crystal layer therebetween;
   a pixel electrode disposed in the lower substrate;
   a common electrode disposed in the lower substrate or the upper substrate;
   a gate driver supplying a scan signal to the plurality of gate lines;
   a data driver supplying data voltages to the respective data lines;
   a touch IC supplying a touch driving signal to the data lines;

a switching unit switching input or output of signals such that a display signal for image display is supplied to the liquid crystal panel during a display period, and the touch driving signal is supplied to the data lines during a non-display period; and a timing controller controlling driving of each of the gate driver, the data driver, and the touch IC, wherein the switching unit comprises a plurality of switches, and the switching unit is provided inside the data driver, wherein during the non-display period, the data lines are driven as touch driving electrodes receiving the touch driving signal, and the common electrode or the gate lines are driven as touch sensing electrodes.

2. The display device of claim 1, wherein the touch IC is built in the data driver.

3. The display device of claim 1, wherein, the plurality of data lines are divided into a certain number of groups, and driven as the touch driving electrodes.

4. The display device of claim 1, wherein, during the non-display period, the switching unit switches input or output of signals such that the touch driving signal from the touch IC is supplied to the data lines.

5. The display device of claim 1, wherein the touch driving electrodes and the touch sensing electrodes are disposed on different layers.

6. The display device of claim 1, wherein the data driver and the touch IC share a same memory.

7. The display device of claim 1, wherein the touch sensing electrodes are arranged at intervals having a dummy pattern disposed between adjacent touch sensing electrodes.

8. The display device of claim 1, wherein the gate lines are divided into a certain number of groups when the gate lines are driven as the touch sensing electrodes.

9. The display device of claim 1, wherein the touch IC senses a capacitive change through the touch sensing electrodes to detect a touched position.

10. The display device of claim 1, wherein the touch IC senses whether there is a use's touch or a touched position during a reference signal period for dividing a previous frame and a next frame.

11. The display device of claim 1, wherein the common electrode is disposed in a direction perpendicular to the data lines.

12. The display device of claim 1, wherein the common electrode is provided in a stripe type.

13. The display device of claim 1, wherein the data driver and the touch IC share a same DC-DC converter for increasing a data voltage.

14. A display device integrated with a touch screen, comprising:

a lower substrate configuring a liquid crystal panel, a plurality of gate lines and a plurality of data lines being arranged to intersect each other in the lower substrate;

an upper substrate configuring the liquid crystal panel, the upper substrate being coupled to the lower substrate with a liquid crystal layer therebetween;

a pixel electrode disposed in the lower substrate;

a common electrode disposed in the lower substrate or the upper substrate;

a gate driver supplying a scan signal to the plurality of gate lines;

a data driver supplying data voltages to the respective data lines;

a touch IC supplying a touch driving signal to the data lines;

a switching unit switching input or output of signals such that a display signal for image display is supplied to the liquid crystal panel during a display period, and the touch driving signal is supplied to the data lines during a non-display period; and a timing controller controlling driving of each of the gate driver, the data driver, and the touch IC, wherein during the non-display period, the data lines are driven as touch driving electrodes receiving the touch driving signal, and the common electrode or the gate lines are driven as touch sensing electrodes.

15. The display device of claim 14, wherein the touch sensing electrodes are arranged at intervals having a dummy pattern disposed between adjacent touch sensing electrodes.

16. The display device of claim 14, wherein, during the non-display period, the switching unit switches input or output of signals such that the touch driving signal from the touch IC is supplied to the data lines.

17. The display device of claim 14, wherein the touch IC is built in the data driver.

18. The display device of claim 14, wherein the touch driving electrodes and the touch sensing electrodes are disposed on different layers.

19. The display device of claim 14, wherein the common electrode is disposed in a direction perpendicular to the data lines.

20. The display device of claim 14, wherein the common electrode is provided in a stripe type.

* * * * *